US012782235B2

(12) United States Patent
De Brett et al.

(10) Patent No.: US 12,782,235 B2
(45) Date of Patent: Nov. 3, 2026

(54) EXCITATION SYSTEM

(71) Applicant: ROLLS-ROYCE PLC, London (GB)

(72) Inventors: Matthew De Brett, London (GB); Christoph W Schwingshackl, London (GB)

(73) Assignee: ROLLS-ROYCE plc, London (GB)

(*) Notice: Subject to any disclaimer, the term of this patent is extended or adjusted under 35 U.S.C. 154(b) by 247 days.

(21) Appl. No.: 18/435,205

(22) Filed: Feb. 7, 2024

(65) Prior Publication Data

US 2024/0295466 A1 Sep. 5, 2024

(30) Foreign Application Priority Data

Mar. 1, 2023 (GB) ...................................... 2302990

(51) Int. Cl.

*G01M 13/025* (2019.01)
*F01D 21/00* (2006.01)
*G01M 7/02* (2006.01)
*G01M 15/14* (2006.01)

(52) U.S. Cl.

CPC ................................ *G01M 13/025* (2013.01)

(58) Field of Classification Search

CPC ....... G01D 5/2033; G01D 5/145; G01M 7/08; G01M 13/04; G01M 7/06; G01M 13/00; G01M 1/10; G01M 7/045; G01M 17/02; G01M 7/027; G01M 13/025; G01M 15/14; G01M 7/04; G01M 7/022; G01M 13/045; G01M 99/00; G01M 7/02; G01M 17/025; F01D 25/06; G01L 3/104; G01H 11/02; G01H 1/06; G01N 3/38; G01N 3/16;

(Continued)

(56) References Cited

U.S. PATENT DOCUMENTS

| | | | |
|---|---|---|---|
| 765,145 | A | 7/1904 | Manahan |
| 5,206,816 | A | 4/1993 | Hill et al. |
| 6,422,813 | B1 | 7/2002 | Mercadal et al. |

(Continued)

FOREIGN PATENT DOCUMENTS

| | | | |
|---|---|---|---|
| CN | 110672292 | B | 1/2021 |
| EP | 2 921 829 | A1 | 9/2015 |

(Continued)

OTHER PUBLICATIONS

Jul. 10, 2024 Search Report issued in European Patent Application No. 24155167.0.

(Continued)

*Primary Examiner* — Brandi N Hopkins
(74) *Attorney, Agent, or Firm* — Oliff PLC

(57) ABSTRACT

Described herein is a non-contact excitation system for a spin rig comprising: a plurality of test piece elements for attachment to a test piece for rotation about an axis of rotation of the spin rig; and a plurality of exciter elements arranged around the axis of rotation, wherein the test piece elements and the exciter elements are magnetically attractive; wherein the test piece elements and/or the exciter elements comprise magnets; and wherein, in use, the exciter elements are arranged around the test piece; wherein each exciter element is axially and radially offset from the plurality of test piece elements. Also described is a method of testing a test piece using the system.

12 Claims, 8 Drawing Sheets

(58) Field of Classification Search
CPC ..... G01P 15/003; B06B 1/045; H01F 41/022; H02K 33/16; H02K 33/12; H02K 21/04
See application file for complete search history.

(56) References Cited

U.S. PATENT DOCUMENTS

| | | | | |
|---|---|---|---|---|
| 2005/0278127 | A1 | 12/2005 | Griffin | |
| 2012/0073118 | A1* | 3/2012 | Bywaters | H02K 15/02 29/596 |
| 2012/0102701 | A1 | 5/2012 | Borufka et al. | |
| 2019/0120717 | A1 | 4/2019 | Gysling et al. | |
| 2020/0072062 | A1 | 3/2020 | MacMahon et al. | |

FOREIGN PATENT DOCUMENTS

| | | | |
|---|---|---|---|
| FR | 2956206 | A1 | 8/2011 |
| JP | S62-150133 | A | 7/1987 |
| JP | H07-55655 | A | 3/1995 |
| JP | 2015-151895 | A | 8/2015 |
| JP | 2020-143977 | A | 9/2020 |
| KR | 2022-0159794 | A | 12/2022 |

OTHER PUBLICATIONS

Jul. 12, 2024 Search Report issued in European Patent Application No. 24155166.2.
Jun. 27, 2024 Search Report issued in European Patent Application No. 24155168.8.
Aug. 17, 2023 Search Report issued in British Patent Application No. 2302991.1.
Aug. 17, 2023 Search Report issued in British Patent Application No. 2302990.3.
Nov. 29, 2023 Search Report issued in British Patent Application No. 2308199.5.
U.S. Appl. No. 18/435,173, filed Feb. 7, 2024 in the name of Matthew De Brett et al.
U.S. Appl. No. 18/435,127, filed Feb. 7, 2024 in the name of Matthew De Brett et al.
Feb. 18, 2026 Notice of Allowance issued in U.S. Appl. No. 18/435,173.

* cited by examiner

EXCITATION SYSTEM

This disclosure claims the benefit of UK Patent Application No. GB 2302990.3, filed on 1 Mar. 2023, which is hereby incorporated herein in its entirety.

TECHNICAL FIELD

The present disclosure relates to a non-contact engine order excitation system for a spin rig.

BACKGROUND

Existing engine order excitation systems for testing and characterising engine components may be used to study dynamic effects such as mistuning or flutter. Engine order excitation systems in spin rigs may use a contact-based method of excitation, such as oil jets.

It may be desirable to provide an improved non-contact engine order excitation system for a spin rig.

SUMMARY

According to a first aspect of the present disclosure there is provided a non-contact excitation system for a spin rig comprising: a plurality of test piece elements for attachment to a test piece for rotation about an axis of rotation of the spin rig; and a plurality of exciter elements arranged around the axis of rotation, wherein the test piece elements and the exciter elements are magnetically attractive; wherein the test piece elements and/or the exciter elements comprise magnets; each exciter element being moveable between an active position, in which a magnetic force is provided between each exciter element and at least one of the test piece elements, and an inactive position, in which the magnetic force between the exciter elements and the at least one test piece element is reduced.

The system may be mounted in a spin rig. The system may be mounted on an inside face of a casing of a spin rig. The system may be mounted on an end wall of a casing of a spin rig. The system may enable production of an engine order excitation of the test piece rotating in a spin rig. The system may enable the excitation force acting on the test piece elements to be reduced quickly. This may enable measurement of a free vibration decay. Measurement of a free vibration decay may be used to characterise damping devices acting on the test piece. The non-contact system may provide greater flexibility and precision over contact systems.

The spin rig may define an axis system, comprising an axial direction (which is aligned with the rotational axis), a radial direction, and a circumferential direction. The axial, radial and circumferential directions are mutually perpendicular.

The test piece elements and the exciter elements are magnetically attractive. Magnetically attractive may mean that the elements may be attracted to a magnet. The test piece elements and the exciter elements may both be magnets, i.e., they may produce magnetic fields. Only one of the test piece elements and the exciter elements may be magnets, i.e., produce magnetic fields. If only one of the test piece elements and the exciter elements are magnets, the other of the exciter elements and the test piece elements may be ferromagnetic elements. Ferromagnetic elements themselves may not produce a magnetic field, but may be attracted to a magnet, such as a permanent magnet or an electromagnet. A magnetically attractive element may be a ferromagnetic elements or a magnet.

The exciter elements may be magnets and the test piece elements may be ferromagnetic elements.

The excitation system may be a magnetic excitation system. The plurality of exciter elements may be a plurality of exciter magnets. The plurality of exciter elements may be an array of exciter elements. The exciter elements may be arranged axisymmetrically about the axis of rotation. The exciter elements may be a circular array of elements. The exciter elements may be permanent magnets. The exciter elements may be electromagnets. The number of exciter elements of the system may be adjustable. The system may be modular.

The test piece elements may be magnets. The test piece elements may be permanent magnets. The test piece elements may be electromagnets. The test piece may be driven to rotate around the axis of rotation by a motor. In use, the elements may be attached to the test piece. The test piece may be mounted on a shaft which is configured to rotate around the axis of rotation. The test piece may be a bladed disc, a bladed ring, a blisk or a bling comprising a plurality of blades. The test piece elements may be attached to a plurality of blades. The test piece elements may each be attached to a tip (i.e., a radially outermost region) of a blade.

In the active position, the exciter elements may be proximate the test piece elements. In the inactive position, the exciter elements may be away from the test piece elements. The magnetic force may be reduced to a negligible force in the inactive position. The exciter elements may be configured to remain at a fixed radial position during testing. The exciter elements may not rotate around the axis of rotation during testing.

Each exciter element may be moveable in an axial direction of the system between the active position and the inactive position.

Each exciter element may be mounted on an exciter element carriage. Each exciter element carriage may carry a plurality of exciter elements. There may be a plurality of exciter element carriages. Each exciter element carriage may be mounted on a rail system. The rail system may be mountable on a casing of a test chamber for a spin rig. The number of exciter elements may be adjustable.

The number of exciter element carriages in the system may be adjustable depending upon the size of the spin rig and test piece to be used.

Each exciter element may be resiliently biased to the inactive position. A spring may provide the resilient biasing. Spring tension and design may be selected to control the speed of movement of the carriage from the active position to the inactive position.

The system may comprise a shock absorber corresponding to at least one exciter element. The shock absorber may dampen the movement of the exciter element from the active to the inactive position. The system may comprise a linear bushing and shock absorber which cooperate to dampen the movement of the exciter element from the active to the inactive position. The shock absorber may inhibit the exciter element (or the exciter element carriage) from coming into contact with a front cover of the spin rig during movement from the active position to the inactive position.

The system may comprise a plurality of electromagnets, each corresponding to at least one exciter element, and each electromagnet may be configured to hold the or each corresponding exciter element in the active position during use. During use may mean during an initial rotation of the test piece about the axis of rotation. The electromagnet may be configured to hold the or each corresponding exciter element in the active position by magnetic engagement with the exciter element carriage. Upon release of the electromagnet, the or each corresponding exciter element may be moved away from the test piece elements. This movement may be rapid such that the excitation force rapidly reduces. The electromagnets may be controlled via a dedicated circuit.

Each exciter element carriage may comprise at least one electromagnet. Each electromagnet may be an energise-to-release electromagnet. Each electromagnet may be powered during use and switched off to release. Release of the electromagnet may cause a spring to move the or each exciter element from the active position to the inactive position. The exciter element may be manually moved from the inactive position into the active position after release of the electromagnet, until the exciter element carriage engages with the electromagnet.

In use, the exciter elements may be arranged around the test piece. Each exciter element may be axially and radially offset from the plurality of test piece elements.

The system may further comprise a test piece to which the test piece elements are attached. The test piece may be a bladed disc and the test piece elements may be attached to tips of the blades. The test piece may be a blisk, a bladed ring or a bling, and the test piece elements may be attached to tips of the blades. The system may further comprise one or more strain gauges attached to the test piece for measurement of the strain on the specimen. A slip ring or telemetry unit may transmit the strain gauge measurements to a recording device. The strain may be measured over time and recorded. Analysis of strain vs time may enable analysis of the vibration free decay and characterisation of any damping devices acting on the test piece.

A fan, such as a fan for a gas turbine engine may be an example of a bladed disc or a blisk. A bladed disc or a blisk may comprise a central portion, from which the blades may extend, for example in a radial direction. The blades may be formed integrally with the central portion. Such an arrangement may be referred to as a blisk. Any suitable method may be used to manufacture such a bladed disc or blisk. For example, for a bladed disc, at least a part of the blades may be machined from a block and/or at least part of the blades may be attached to the hub/disc by welding, such as linear friction welding. The bladed disc or blisk as described herein may have any desired number of blades, for example 14, 15, 16, 17 18, 19, 20, 21, 22, 23, 24, 25 or 26 blades.

According to a second aspect of the present disclosure, there is a provided a method of testing a test piece using the non-contact excitation system for a spin rig according to any of the statements relating to the first aspect, the method comprising: attaching the plurality of test piece elements to the test piece; rotating the test piece about the axis of rotation; and reducing the magnetic force between the exciter elements and the test piece elements by moving the exciter elements from the active position to the inactive position.

According to a third aspect of the present disclosure, there is provided a non-contact excitation system for a spin rig comprising: a plurality of test piece elements for attachment to a test piece for rotation about an axis of rotation of the spin rig; and a plurality of exciter elements arranged around the axis of rotation, wherein the test piece elements and the exciter elements are magnetically attractive; wherein the test piece elements and/or the exciter elements comprise magnets; and wherein, in use, the exciter elements are arranged around the test piece; wherein each exciter element is axially and radially offset from the plurality of test piece elements.

The exciter elements may be arranged in an axisymmetric array. The exciter elements may be spaced equidistantly apart from neighbouring elements in the array. The exciter elements may be arranged circumferentially around the test piece. The exciter elements may be spaced at varying distances apart from neighbouring elements in the array (i.e., not equidistantly). A non-equidistant arrangement may allow the generation of multiple excitation frequencies. The number of exciter elements around the circumference and their spatial distribution determines the fundamental frequency and characteristics of excitation force applied to the test piece.

The location of the exciter elements relative to the test piece elements may influence the characteristics of the magnetic force exerted on the test piece. The system may minimise the risk of a collision between the test piece and exciter elements. The system may optimise the profile of the force exerted on the test piece. The system may offer a smoother, more controllable force profile since the main force component exerted on the blade is a shear force in the axial axis.

The exciter elements may be magnets which may each have a magnetic pole which may be oriented radially. The magnetic poles may be oriented circumferentially or axially. The plurality of exciter elements may be magnets which may alternate in polarity in a circumferential direction around the axis of rotation. The magnets may be oriented such that neighbouring magnets have similar poles, alternating poles, or a mixture of both depending upon the desired excitation. The magnets may vary in strength, for example to generate a sinusoidal forcing field. The exciter magnets may be permanent magnets. The exciter magnets may be bar magnets.

The test piece may be a bladed disc or a blisk and the test piece elements may be for attachment to a plurality of blade tips. The test piece elements may be for attachment to a radially outermost position of a blade tip.

The test piece elements may be magnets and may each have a magnetic pole oriented radially. The magnetic poles may be oriented circumferentially or axially. The plurality of test piece elements may be magnets which alternate in polarity in a circumferential direction around the axis of rotation. The magnets may be oriented such that neighbouring elements have similar poles, alternating poles, or a mixture of both depending upon the desired excitation. The magnets may vary in strength, for example to generate a sinusoidal forcing field.

The system may comprise an adapter piece for adjustment of the system to accommodate a range of sizes of test piece and/or for testing at a range of engine orders. An adapter piece may be provided to alter a radial distance between an exciter element and a test piece element in the active position.

Each exciter element may be moveable between an active position, in which a magnetic force is provided between each exciter element and at least one of the test piece elements, and an inactive position, in which the magnetic force between the exciter elements and the at least one test piece element is reduced.

The system may further comprise a test piece to which the test piece elements are attached. According to a fourth aspect of the present disclosure, there is provided a method of testing a test piece using the non-contact excitation system for a spin rig of any of the statements relating to the third aspect, comprising: attaching the plurality of test piece elements to the test piece; and rotating the test piece about the axis of rotation.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example only, with reference to the figures, in which.

Figure 3A:
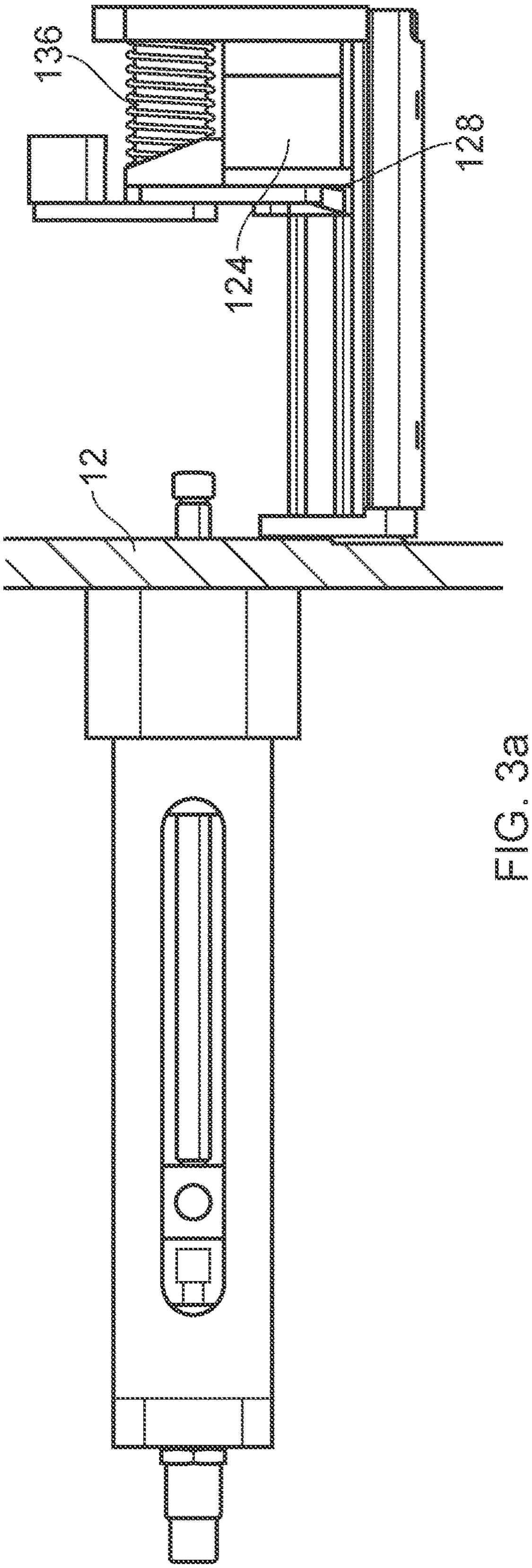
Figure 3B:
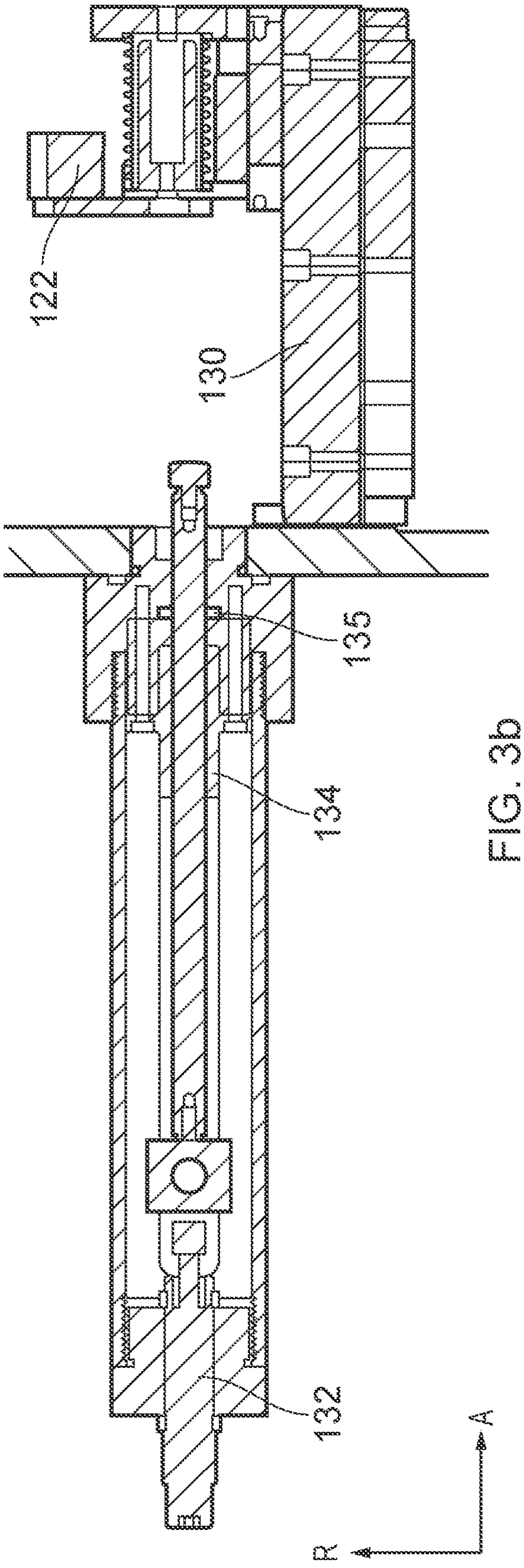
Figure 4:
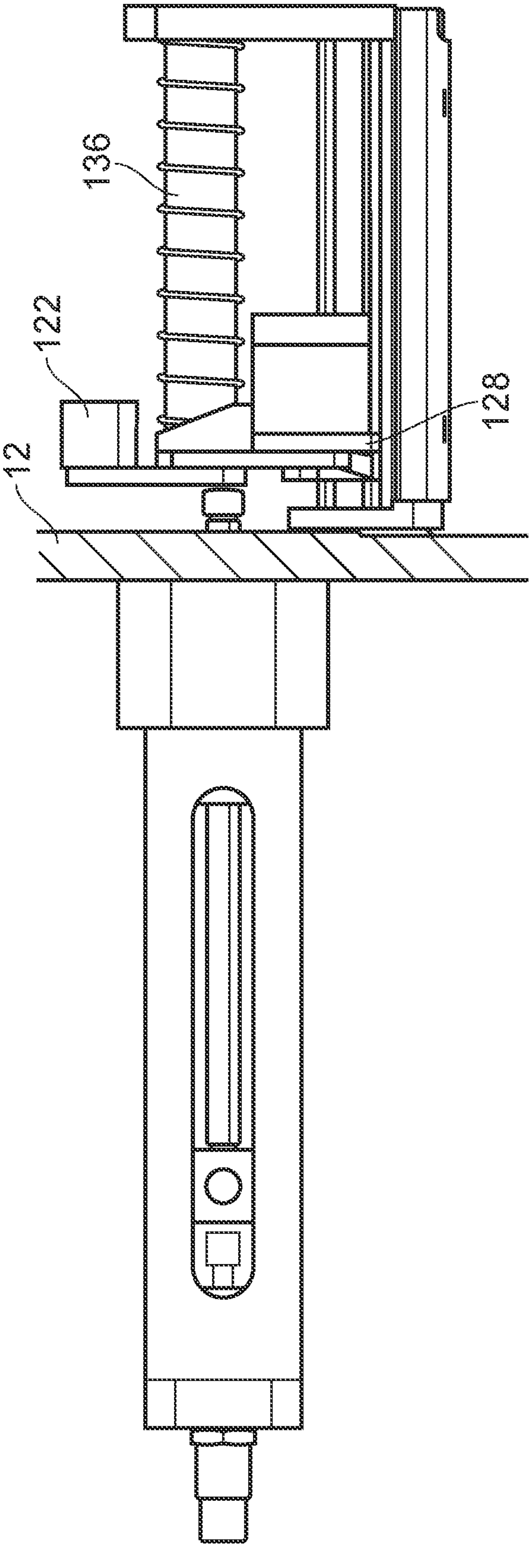
Figure 5A:
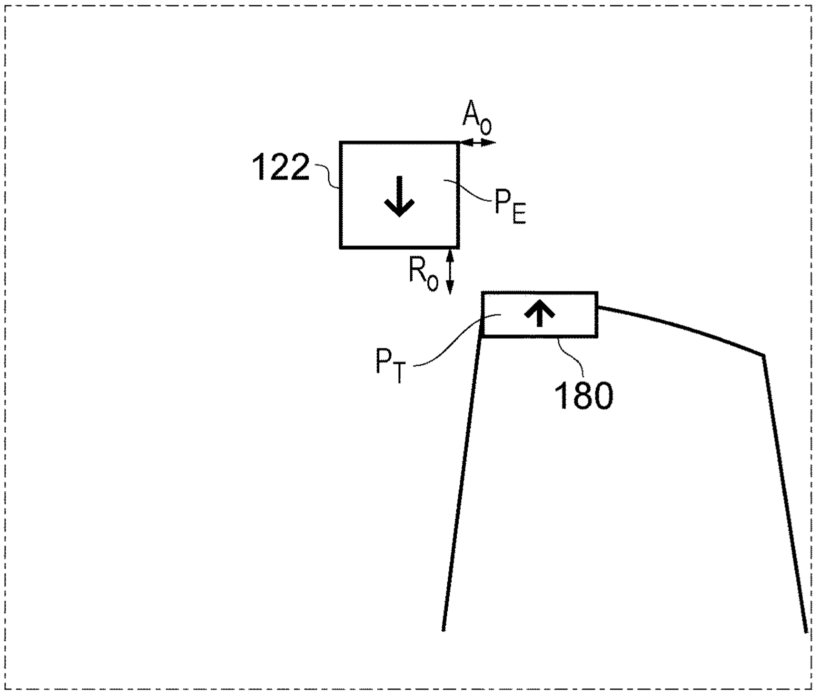
Figure 5B:
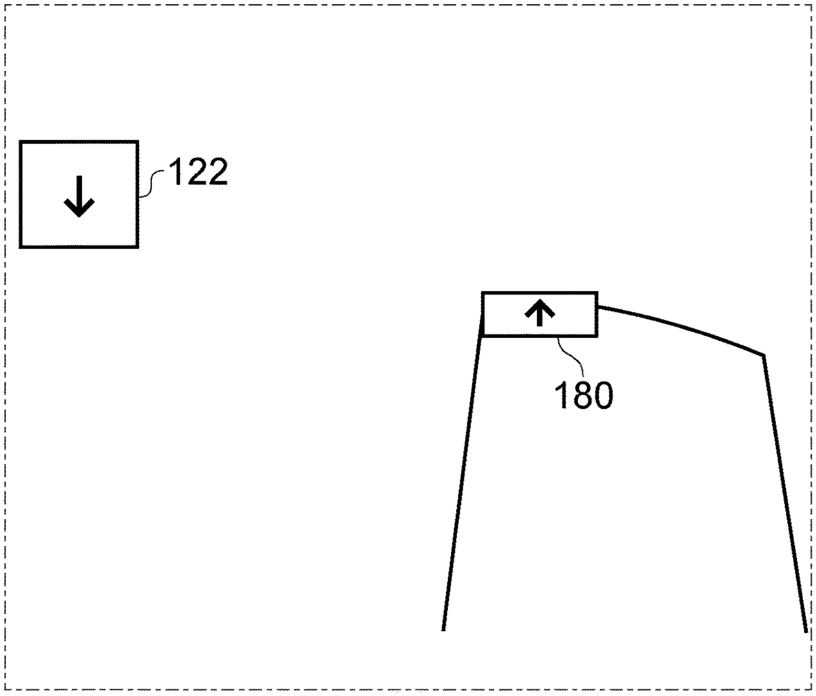
Figure 5C:
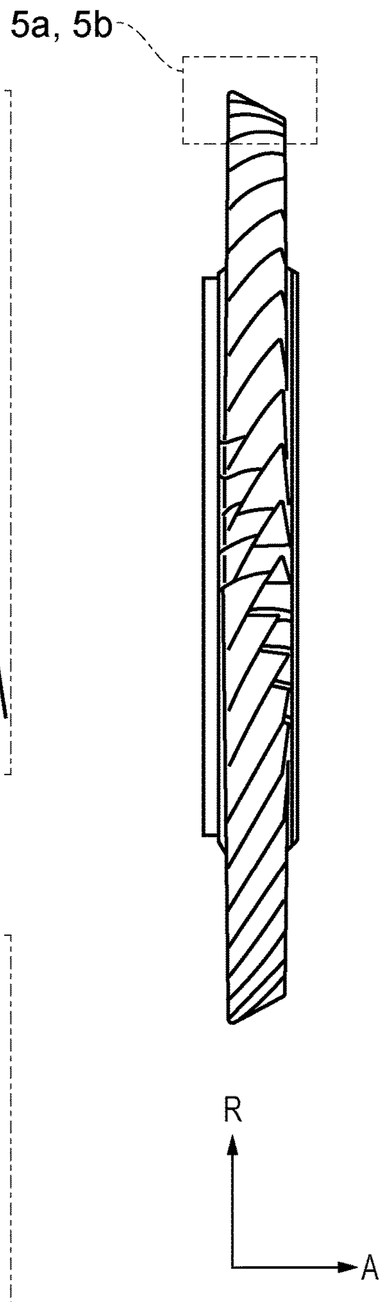

FIGS. 3*a* and 3*b* are side and sectional views, respectively, of an exciter element carriage, rail and damping system according to the disclosure in an active position;

FIG. 4 is a side view, of an exciter element carriage, rail and damping system according to the disclosure in an inactive position;

FIGS. 5*a* and 5*b* show the relative position of an exciter element and a test piece element in an active and inactive position, respectively, enlarged from the area indicated in FIG. 5*c;*

Figure 6A:
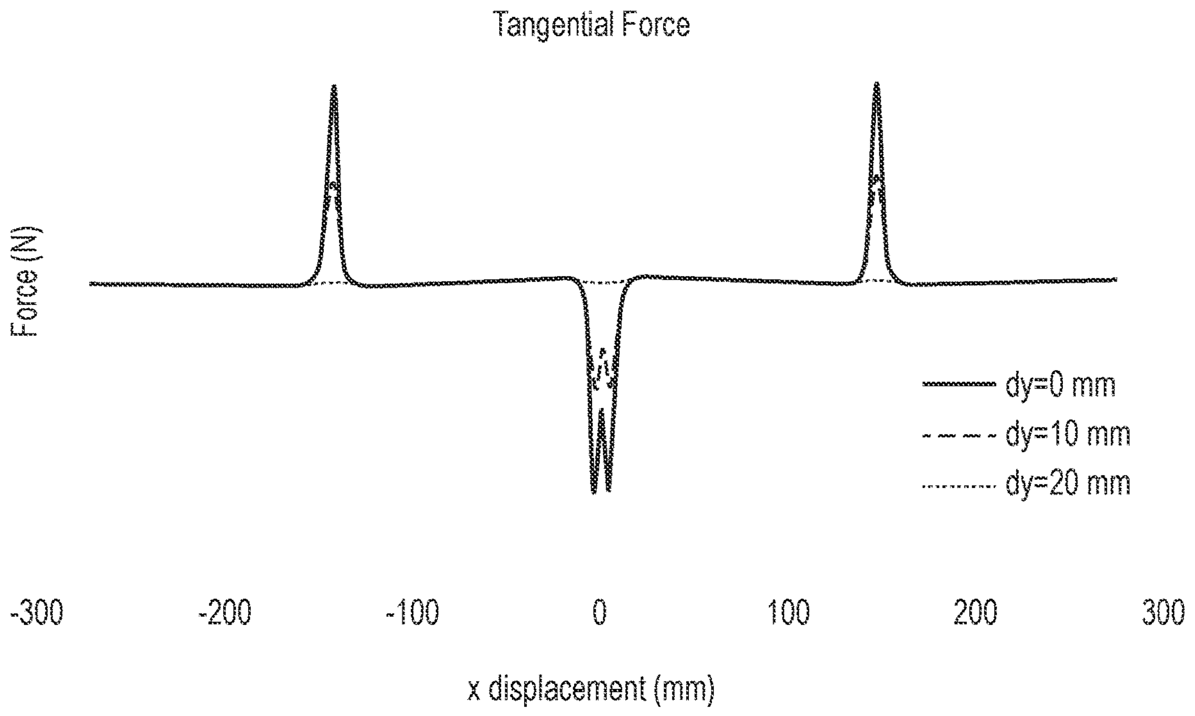
Figure 6B:
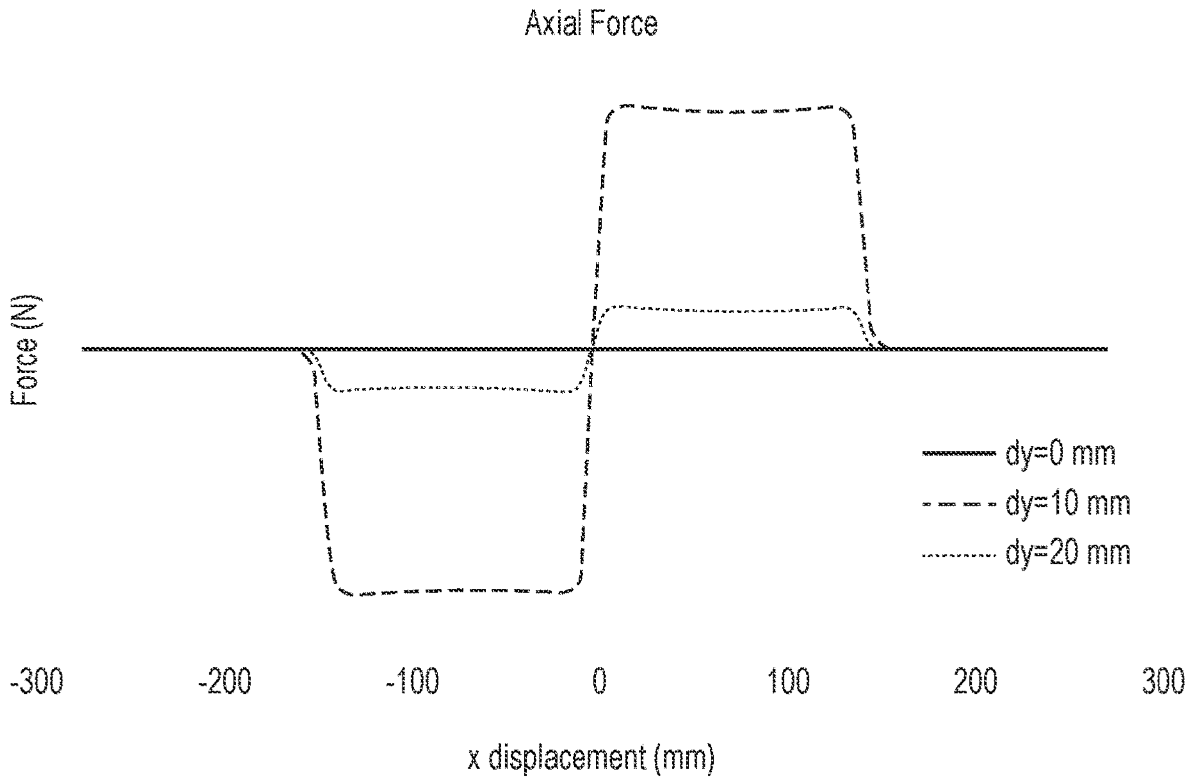
Figure 7:
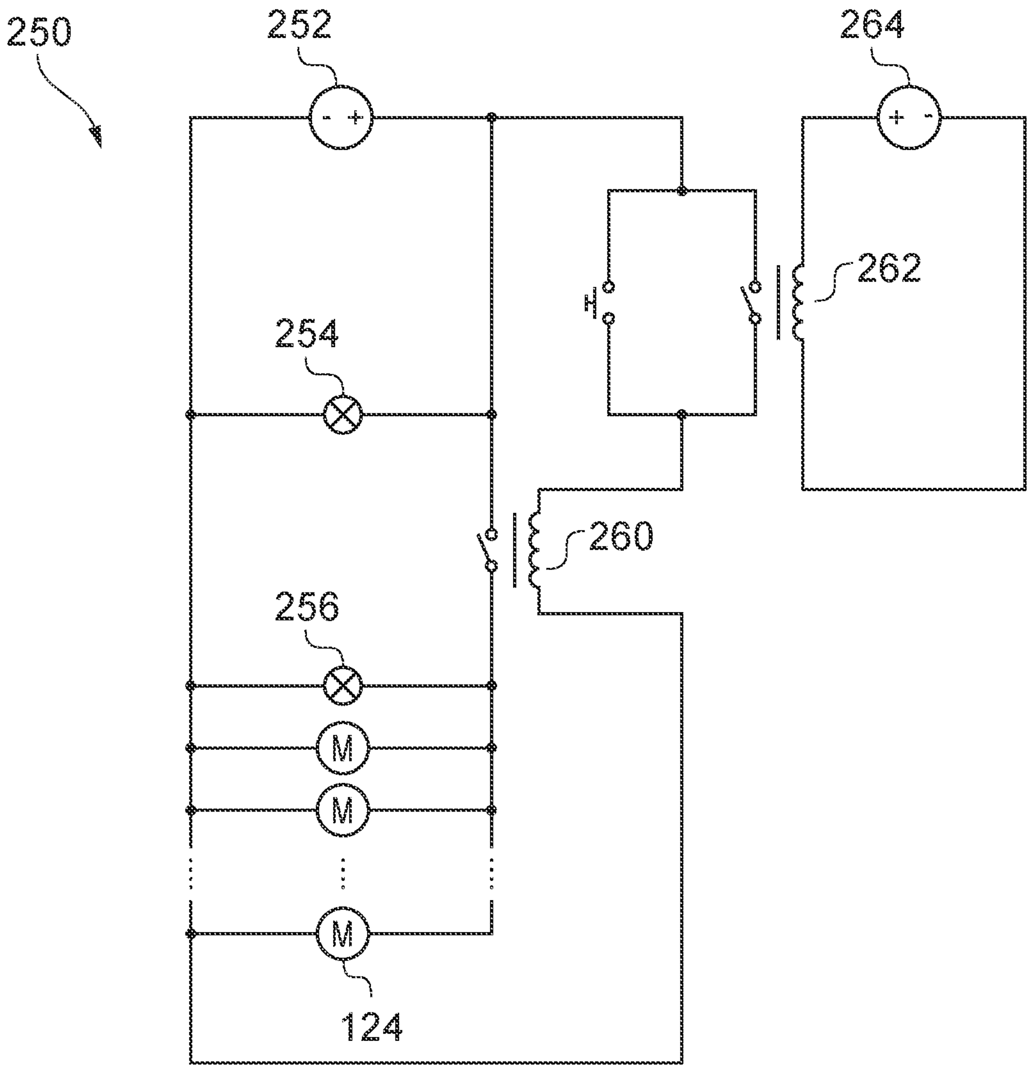
Figure 8:
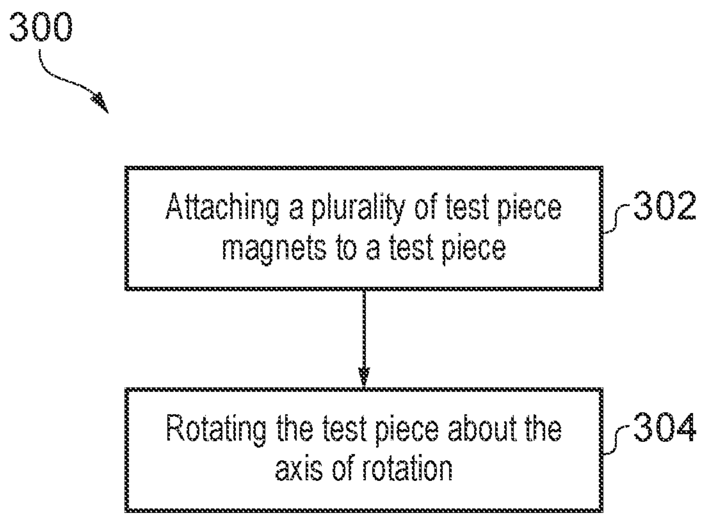

FIGS. 6*a* and 6*b* show force-displacement graphs for tangential and axial forces, respectively;

FIG. 7 is a circuit diagram of a control system according to the disclosure;

FIG. 8 shows a schematic method according to the disclosure; and

Figure 9:
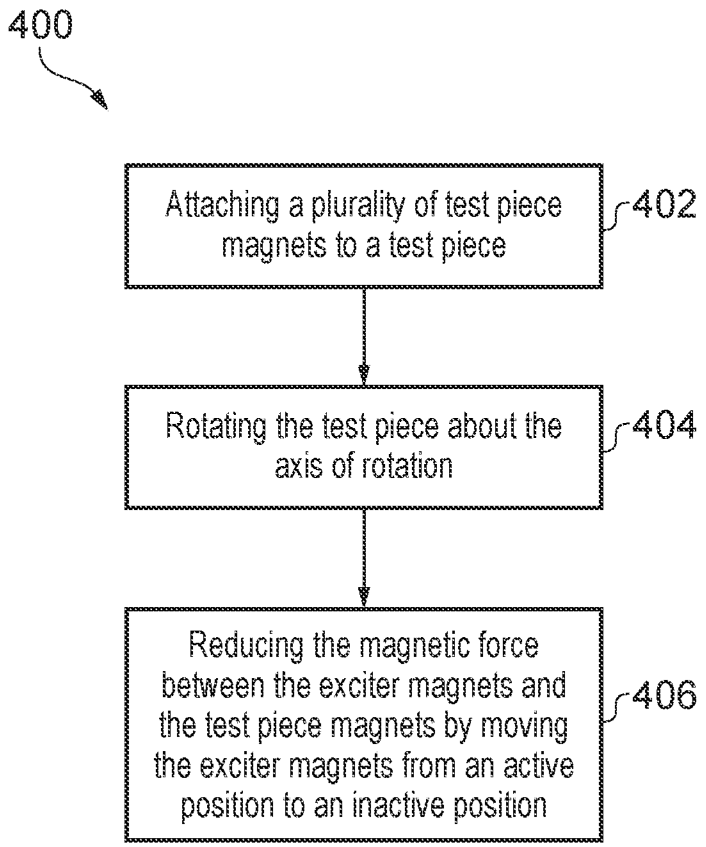

FIG. 9 shows a schematic method according to the disclosure.

DETAILED DESCRIPTION

Figure 1:
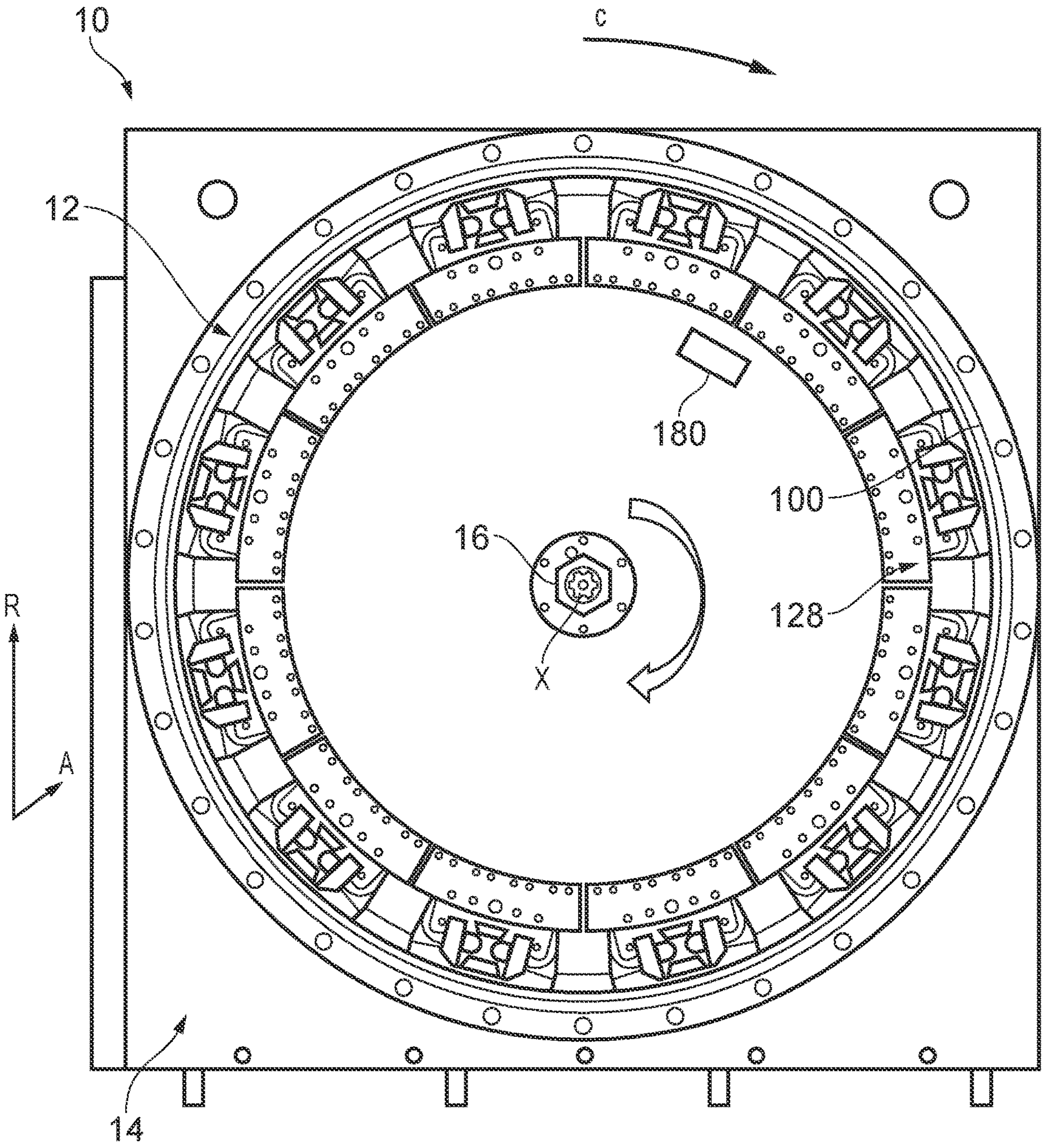
FIG. 1 is an axial view of a spin rig and a system according to the disclosure.

FIG. 1 shows a spin rig 10, comprising a non-contact excitation system 100. The spin rig 10 comprises a shaft 16 to which a test piece 200 may be mounted (not shown in FIG. 1). The shaft 16 defines an axis of rotation X. The spin rig 10 is enclosed by a casing, which includes a front flange 12 and a backplate 16.

For testing, a test piece 200 is mounted to the shaft 16 and a motor (not shown) is used to drive the test piece 200 to rotate around the axis of rotation X. The test piece in this example is a blisk, with blades extending outwardly (radially) from the centre). The excitation system comprises magnetically attractive test piece elements 180, in this example test piece magnets for attachment to the test piece. As will be described in more detail, the test piece magnets are attached to the test piece at a tip (or radially outermost region) of the test piece 200, for instance at one or more blade tips. The magnetic poles ($P_T$) of the test piece magnets are oriented radially (see FIG. 5). In this example, all of the test piece magnets have the same pole pointing in the same direction (radially). In other examples, each individual test piece magnet may be arranged in any orientation, such as in alternating directions relative to neighbouring test piece magnet poles, or in any other arrangement, to provide a desired excitation.

The geometry of the spin rig 10, and components thereof, is defined by a conventional axis system, comprising an axial direction A (which is aligned with the rotational axis X and is directed into the page in the FIG. 1 view), a radial direction (in the bottom-to-top direction in FIG. 1), and a circumferential direction C around the rotational axis X of FIG. 1. The axial, radial and circumferential directions are mutually perpendicular.

The non-contact excitation system 100 is a magnetic engine order excitation system. Referring to FIGS. 1-5, the excitation system 100 comprises a plurality of magnetically attractive exciter elements 122, in this example exciter magnets arranged around the axis of rotation X.

It will be appreciated that, in this example, both the exciter elements 122 and test piece elements 180 are magnets. However, in other examples, only one of the plurality of exciter elements 122 and the plurality of test piece elements 180 may be magnets. In such an example, the other plurality of elements 122, 180 are not magnets but are ferromagnetic elements which are attracted to a magnet. As long as at least one of the plurality of test piece elements and the plurality of exciter elements are magnets, a magnetic field will be produced and a magnetically attractive element in proximity to the magnet will experience a magnetic force.

The excitation magnets 122 are arranged in a circular array around the circumference of the test piece 200. The excitation magnets 122 in this example are permanent bar magnets. The system 100 may provide flexibility, precision and a reduction in contaminants compared with previous excitation systems.

The exciter magnets 122 are each mounted on a carriage 128, which is mounted to the front flange 12 via a mounting system. In this example, each carriage 128 has three exciter magnets, but in other examples a different number of exciter magnets 122 may be provided. As shown in FIG. 1, in this example, there are 12 carriages 128 arranged around the circumference of the test piece 200 forming a circular array, however in other examples, a different number may be provided. The number of carriages 128 may be dependent upon the geometry of the spin rig 10 and the test piece 200 and the desired excitations for testing. The number of exciter magnets around the circumference and their spatial distribution may determine the fundamental frequency and characteristics of excitation force applied to the test piece 200.

The carriage 128 is mounted on a rail 138, along which it is movable. In use, the rail 130 is arranged axially, such that movement of the carriage 128 along the rail 130 is axial movement.

Figure 2:
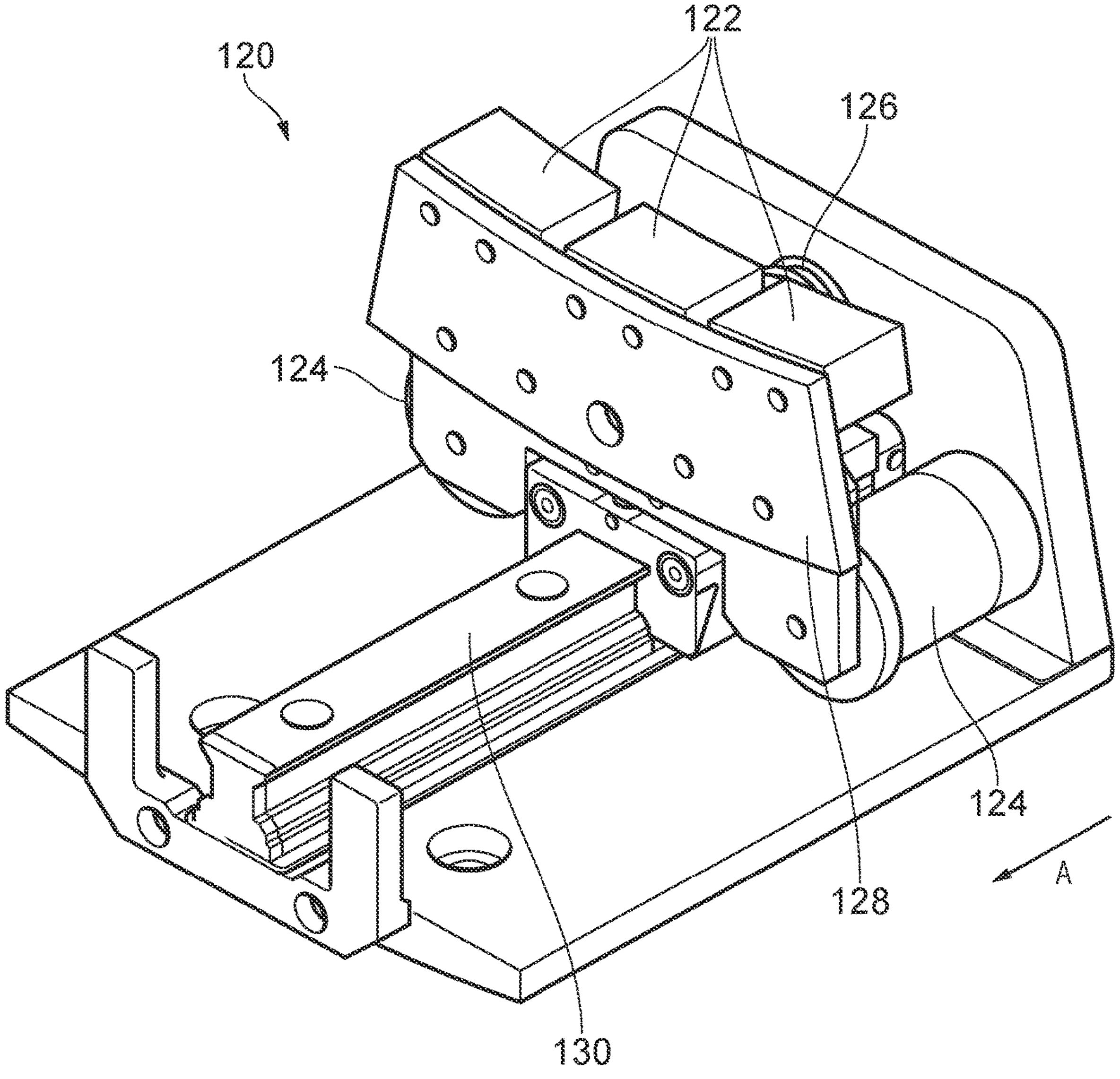
FIG. 2 is a perspective view of an exciter element carriage and rail according to the disclosure.

A first position of the carriage 128 on the rail 130, shown in FIGS. 2, 3 and 5*a*, is an active position. In this position, the exciter magnets 122 are at their closest position to the test piece magnets 180 and the test piece 200. In the active position, a magnetic force is provided between each exciter magnet and at least one of the test piece magnets 180. In the active position, the carriage 128 is at its furthest position from the front flange 12 of the casing. By positioning the exciter magnets 122 close to the test piece 200, the force amplitude is amplified.

In use, the exciter magnets 122 are arranged around the test piece 200 and the test piece magnets 180. In the active position, each exciter magnet 122 is axially and radially offset from the plurality of test piece magnets 180, as shown in FIG. 5*a* which is a schematic representation showing the relative position of the magnets 122, 180 (but does not show the carriage, rail, electromagnets, etc). The location of the exciter magnets 122 relative to the test piece magnets 180 influences the characteristics of the force exerted on the test piece 200. The relative location used in this system may minimise the risk of a collision between the test piece 180 and exciter magnets 122 when the test piece 200 is vibrating with an axial or radial component. This risk is significant in mistuned blisks, where blade vibration amplitudes have higher variance. The relative location used in this system may optimise the profile of the force exerted on the test piece. The main force component exerted on the test piece 200 is a shear force in the axial axis, which offers a smoother, more controllable force profile.

By providing an axial offset between the plurality of exciter magnets 122 and the plurality of test piece magnets 180, the exciter magnets 122 may be out of alignment in an axial direction by a distance $A_o$. By providing a radial offset between the plurality of exciter magnets 122 and the plurality of test piece magnets 180, the exciter magnets 122 may be out of alignment in a radial direction by a distance $R_o$. The axial and radial offset distances $A_o$, $R_o$ may be measured from a respective edge of each magnet 122, 180.

The exciter magnets 122 each have a magnetic pole ($P_E$) which is aligned radially. The plurality of exciter magnets (122) alternate in polarity in a circumferential direction around the axis of rotation X. For instance, an exciter magnet 122 having a south pole aligned pointing towards the rotational axis X will be between two exciter magnets having a north pole aligned pointing towards the rotational axis X. In other examples, different orientation patterns of neighbouring magnetic poles may be desired. The magnets may vary in strength, for example to generate a sinusoidal forcing field.

FIGS. 6a and 6b show simulations of the tangential and axial forces exerted on a test piece 200 (a blisk) as it passes below two exciter magnets 122 with opposite polarities and radially-aligned poles. The different lines represent positions with constant radial offset and different axial offsets. The solid line represents a configuration of radial offset with no axial offset (dy=0). In this arrangement, the main force component exerted on the test piece 200 is a shear force in the tangential axis (FIG. 6a). Although the shear force can have a relatively large amplitude it tends to have a sharp character that could introduce unwanted higher harmonics into the vibration response of the test piece 200.

In the radial and axial offset configuration, the main force component is shown by the dashed (dy=10 mm) and dotted (dy=20 mm) lines. The axial force (FIG. 6b), when axial offset is present, more closely resembles a square wave. The square shape gives it a large amplitude at the fundamental frequency. When the vibration of the test piece 200 is taken into account the square shape becomes more sinusoidal, which lessens the influence of higher harmonics. Therefore, the main force component exerted on the test piece when both axial and radial offset are present, is a shear force in the axial axis, which offers a smoother, more controllable force profile.

Referring back to FIGS. 3a, 3b, 4b and 5b, as described above, the carriage 128 and the exciter magnets 122 are movable along a rail 130 in the axial direction, from the active position of FIGS. 3a and 3b, to the inactive position shown in FIGS. 4 and 5b. The carriage 128 is moved axially from the test piece 200 in the direction of the front flange 12. In this position, the magnetic force between the exciter magnets 122 and the test piece magnet 180 is reduced. If the exciter magnets 122 are moved far enough away, the excitation force acting on the test piece 200 rapidly reduces to zero.

The movement of the carriage 128 and the exciter magnets 122 is controlled by a pair of electromagnets 124. In this example, the carriage has two electromagnets 124, but in other examples there may be only one or more than two electromagnets 124 present in each carriage 128. The electromagnets 128 are energised to release electromagnets 128 and are configured to hold the or each corresponding exciter magnet 122 (and carriage 128) in the active position during use. A spring 126 is also provided, which is attached to the carriage 128 and resiliently biases the carriage 128 to the inactive position. The spring 126 is compressed in the active position and is configured to push the carriage 128 away along the rail 130 to the inactive position when the electromagnet 124 is released. The spring length, spring constant and electromagnet strength may be adjusted according to the properties of the exciter and test piece magnets 122, 180 and the desired speed of movement from the active to the inactive position.

A reset and braking sub-system for the excitation system 100 is shown in FIGS. 3a, 3b and 4. The reset and braking sub-system comprises a shock absorber (132) corresponding to at least one exciter magnet 122, in this example three exciter magnets 122 on the carriage, the shock absorber 132 to dampen the movement of the exciter magnet(s) 122 and the carriage 128 from the active to the inactive position. The shock absorber 132 is connected to the exciter magnet(s) 122 and the carriage via a linear bushing 134 and a linear seal 136. The linear bushing 134 and shock absorber 132 may safely stop the carriage without it impacting the front flange 12. By manually pushing the carriage 128 backwards until it engages with the electromagnets 124, the carriage (and exciter magnets 122) may be reset into the active position.

In the system described herein, there are 12 reset and braking sub-systems that mounted to the front flange 12 of the casing, however the number can be scaled up or down, in the same way as the number of carriages 128, by adjusting the number (and size) reset and braking sub-systems in order to fit smaller or larger scale spin rigs 10. An adapter piece may be provided, which fits to the carriage 128 to alter the radial position of the exciter magnets 122. This may increase or decrease the radial distance between an exciter magnet and a test piece magnet. The use of adapter pieces may mean that different engine orders and test piece diameters can be tested with minimal alteration to the system.

A control system circuit 250 for controlling the release of the electromagnets 124 is shown in a circuit diagram in FIG. 7. In the circuit, there is a 24V DC supply 252, a power-on indicator 254, a timer relay 260, a solid-state relay 262 and a controller 264. The electromagnets are indicated at 124. As described above, the control system 250 features "energise-to-release" electromagnets 124 so that when the circuit is closed, the electromagnets 124 are energised, and the carriage 138 is released. Upon resetting the system 100 by manually pushing the carriages 138 back into the active position, the control system circuit 250 is opened again, and the carriages 128 are therefore held in place by the electromagnets 124.

Methods for test procedures using the excitation system 100 as described above are shown in FIGS. 8 and 9. In FIG. 8, the method of testing a test piece 200 using the non-contact excitation system 100 comprises attaching (step 302) the plurality of test piece magnets 180 to the test piece 200; and rotating (step 304) the test piece 200 about the axis of rotation X. In FIG. 9, the method of testing a test piece 200 using the non-contact excitation system 100 comprises attaching (step 402) the plurality of test piece magnets 180 to the test piece 200; rotating 404 the test piece 200 about the axis of rotation X; and reducing (step 406) the magnetic force between the exciter magnets 122 and the test piece magnets 180 by moving the exciter magnets 122 from the active position to the inactive position.

By rotating the test piece in the spin rig 10 with the excitation system 100, an engine order excitation of the test piece 200 may be produced. Once the test piece vibration response has reached a steady state, the excitation force acting on the test piece may then be rapidly removed by moving the exciter magnets 122 from the active position (i.e. close to the test piece 200) to the inactive position (i.e. away from the test piece 200), by briefly sending power to the electromagnets 124. The carriage 128 is released, and the spring 126 pushes it towards the front flange, moving the exciter magnets 122 away from the test piece 200.

Depending on the objective of the specific test and the actual test piece, several vibration measurement systems can be adopted. In this case one or more strain gauges may be attached on the rotating test piece and strain vs time may be continuously recorded. A slip ring or telemetry device may transmit strain data from the strain gauges to a recording device.

Once the excitation force is removed, the measurement will record the reduction of strain with time allowing for an evaluation of the mechanical damping of the specimen. Damping devices, such as friction dampers, may be added to the test piece to provide non-linear damping. Applying and then removing the excitation force may enable measurement of a free vibration decay, which in turn may provide amplitude dependent damping information, which may be used to characterise tested damping devices. Signal conditioning, data acquisition and post-processing hardware and software may be used to obtain the data.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

What is claimed is:

1. A spin rig system comprising:

a shaft configured to have a test piece mounted on the shaft, wherein the shaft defines an axis of rotation (X);

a casing including a front flange and a backplate;

a plurality of test piece elements for attachment to a test piece for rotation about the axis of rotation (X) of the spin rig; and a non-contact excitation system including a plurality of exciter elements arranged around the axis of rotation, wherein the test piece elements and the exciter elements are magnetically attractive;

the test piece elements and/or the exciter elements comprise magnets;

the exciter elements are configured to be arranged around the test piece such that each of the exciter elements is axially and radially offset from the plurality of test piece elements; and the casing is configured to enclose the shaft and the non-contact excitation system.

2. The spin rig system according to claim 1, wherein the plurality of exciter elements are magnets which each have a magnetic pole which is oriented radially.

3. The spin rig system according to claim 1, wherein the plurality of exciter elements are magnets which alternate in polarity in a circumferential direction around the axis of rotation.

4. The spin rig system according to claim 1, wherein the plurality of exciter elements are permanent magnets.

5. The spin rig system according to claim 1, wherein the plurality of exciter elements are bar magnets.

6. The spin rig system according to claim 1, wherein the test piece is a bladed disc and the test piece elements are for attachment to a plurality of blade tips.

7. The spin rig system according to claim 1, wherein the test piece elements are magnets which each have a magnet pole which is oriented radially.

8. The spin rig system according to claim 1, wherein the test piece elements are magnets which alternate in polarity in a circumferential direction around the axis of rotation.

9. The spin rig system according to claim 1, wherein the exciter elements are magnets and the test piece elements are ferromagnetic elements.

10. The spin rig system according to claim 1, wherein each exciter element is moveable between an active position, in which a magnetic force is provided between each exciter element and at least one of the test piece elements, and an inactive position, in which the magnetic force between the exciter elements and the at least one of the test piece elements is reduced.

11. The spin rig system according to claim 1, comprising the test piece to which the test piece elements are attached.

12. A method of testing a test piece using the spin rig system according to claim 1, comprising:

attaching the plurality of the test piece elements to the test piece; and rotating the test piece about the axis of rotation (X).

* * * * *